(12) United States Patent
Schygge et al.

(10) Patent No.: US 9,296,306 B2
(45) Date of Patent: Mar. 29, 2016

(54) BATTERY POWERED VEHICLE WITH IMMOBILIZING CHARGER PLUG (75) Inventors: Sebastian Schygge, Huskvarna (SE); Pasi Viskari, Motala (SE); Sean Dwyer, Gastonia, NC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/349,336

(22) PCT Filed: Oct. 3, 2011

(86) PCT No.: PCT/US2011/054577
§ 371 (c)(1),
(2), (4) Date: Apr. 3, 2014

(87) PCT Pub. No.: WO2013/052027
PCT Pub. Date: Apr. 11, 2013

(65) Prior Publication Data
US 2014/0244090 A1 Aug. 28, 2014

(51) Int. Cl.
*H02J 7/00* (2006.01)
*B60L 11/18* (2006.01)
*B60K 28/00* (2006.01)
*B60L 3/00* (2006.01)

(52) U.S. Cl.
CPC .............. *B60L 11/1824* (2013.01); *B60K 28/00* (2013.01); *B60L 3/0046* (2013.01); *B60L 11/1805* (2013.01); *B60L 11/1818* (2013.01); *B60L 11/1877* (2013.01); *B60L 2200/40* (2013.01); *B60L 2210/30* (2013.01); *B60L 2250/16* (2013.01); *B60Y 2200/223* (2013.01); *B60Y 2200/91* (2013.01); *B60Y 2400/214* (2013.01); *Y02T 10/7005* (2013.01); *Y02T 10/705* (2013.01); *Y02T 10/7241* (2013.01); *Y02T 90/127* (2013.01); *Y02T 90/14* (2013.01)

(58) Field of Classification Search
None
See application file for complete search history.

(56) References Cited

U.S. PATENT DOCUMENTS

| 3,570,227 | A | | 3/1971 | Bellinger |
| 4,145,864 | A | | 3/1979 | Brewster, Jr. |
| 5,202,617 | A | * | 4/1993 | Nor ........................... B60L 3/12 320/109 |

(Continued)

OTHER PUBLICATIONS

International Search Report and Written Opinion of PCT/US2011/054577 mailed on Jan. 30, 2012.

(Continued)

*Primary Examiner* — Jonathan M Dager
(74) *Attorney, Agent, or Firm* — Nelson Mullins Riley & Scarborough LLP (57) ABSTRACT A battery powered vehicle may include a battery power source, an electric drive motor, a charging receptacle, and a drive controller. The electric drive motor may be powered by the battery power source. The electric drive motor may be operably coupled to a wheel of the battery powered vehicle to provide drive power for the battery powered 5 vehicle. The charging receptacle may be configured to enable charging of the battery power source via a battery charging assembly connectable to the charging receptacle. The charging receptacle may include circuitry forming a detection loop closed responsive to operable coupling of the charging receptacle with a charger plug of the battery charging assembly. The closing of the detection loop may generate an indication that the charging 10 receptacle is operably coupled to the charger plug. The drive controller may include processing circuitry configured to implement a mobility restriction at least with respect to operation of the electric drive motor responsive to the indication.

20 Claims, 8 Drawing Sheets

(56) References Cited

U.S. PATENT DOCUMENTS

| | | | | |
|---|---|---|---|---|
| 5,301,494 | A * | 4/1994 | Peot | H01R 13/447 320/107 |
| 5,536,173 | A * | 7/1996 | Fujitani | B60L 11/1818 439/321 |
| 5,556,284 | A * | 9/1996 | Itou | B60L 11/1846 180/65.1 |
| 6,087,805 | A * | 7/2000 | Langston | B60L 11/1816 320/109 |
| 6,225,776 | B1 * | 5/2001 | Chai | B60L 3/0069 320/109 |
| 6,371,768 | B1 | 4/2002 | Neblett et al. | |
| 6,917,180 | B2 * | 7/2005 | Harrison | B60L 7/12 320/104 |
| 7,728,534 | B2 * | 6/2010 | Lucas | A01D 69/025 318/139 |
| 7,791,217 | B2 * | 9/2010 | Kamaga | B60L 11/1816 307/10.1 |
| 7,859,219 | B2 * | 12/2010 | Harris | B60L 11/1818 320/104 |
| 8,025,526 | B1 * | 9/2011 | Tormey | B60L 3/0069 320/109 |
| 8,063,757 | B2 * | 11/2011 | Frey | B60L 3/0069 340/438 |
| 8,075,329 | B1 * | 12/2011 | Janarthanam | B60L 11/1818 439/304 |
| 8,098,041 | B2 * | 1/2012 | Kokotovich | B60K 6/365 320/104 |
| 8,393,423 | B2 * | 3/2013 | Gwozdek | B60T 17/18 180/65.21 |
| 8,454,377 | B2 * | 6/2013 | Heichal | B60K 1/04 180/65.1 |
| D686,983 | S * | 7/2013 | Schygge | D13/107 |
| 8,618,767 | B2 * | 12/2013 | Ishii et al. | 320/104 |
| 8,710,372 | B2 * | 4/2014 | Karner | B60L 11/1816 174/135 |
| 8,764,469 | B2 * | 7/2014 | Lamb | H01R 13/633 320/109 |
| 8,917,054 | B2 * | 12/2014 | Acena | B60L 11/1838 320/104 |
| 2002/0170399 | A1 | 11/2002 | Gass et al. | |
| 2006/0017445 | A1 * | 1/2006 | Flock | B60R 16/023 324/503 |
| 2006/0132085 | A1 * | 6/2006 | Loubeyre | B60K 6/48 320/104 |
| 2007/0090810 | A1 * | 4/2007 | Dickinson | H01M 2/1077 320/150 |
| 2009/0096416 | A1 * | 4/2009 | Tonegawa | B60K 6/445 320/109 |
| 2010/0134067 | A1 * | 6/2010 | Baxter | B60L 3/0084 320/109 |
| 2010/0213896 | A1 * | 8/2010 | Ishii | B60L 3/0069 320/109 |
| 2010/0320964 | A1 * | 12/2010 | Lathrop | B60K 6/445 320/109 |
| 2011/0037317 | A1 * | 2/2011 | Kuschnarew | B60L 11/1887 307/9.1 |
| 2011/0300738 | A1 * | 12/2011 | Hengel | B60L 11/1818 439/374 |
| 2012/0007552 | A1 * | 1/2012 | Song | B60L 7/14 320/109 |
| 2012/0007554 | A1 * | 1/2012 | Kanamori | B60L 11/1824 320/109 |
| 2012/0025842 | A1 * | 2/2012 | Gibbs | G01R 31/045 324/45 |
| 2013/0024306 | A1 * | 1/2013 | Shah | G06Q 20/32 705/17 |
| 2013/0096748 | A1 * | 4/2013 | Hussain | B60W 10/06 701/22 |
| 2013/0162221 | A1 * | 6/2013 | Jefferies | B60L 11/1816 320/155 |
| 2014/0144117 | A1 * | 5/2014 | Schygge | B60L 11/18 56/10.7 |
| 2014/0150390 | A1 * | 6/2014 | Schygge | A01D 69/02 56/10.2 A |
| 2014/0165523 | A1 * | 6/2014 | Schygge | A01D 34/78 56/10.7 |
| 2014/0165524 | A1 * | 6/2014 | Schygge | B60L 8/003 56/10.7 |
| 2014/0244090 | A1 | 8/2014 | Schygge et al. | |
| 2015/0021985 | A1 * | 1/2015 | Matsuda | B60L 11/1877 307/10.1 |
| 2015/0042160 | A1 * | 2/2015 | Matsuda | B62K 11/04 307/10.3 |

OTHER PUBLICATIONS

Chapter I of the International Preliminary Report of Patentability of PCT/US2011/054577 issued on Apr. 8, 2014.

* cited by examiner

BATTERY POWERED VEHICLE WITH IMMOBILIZING CHARGER PLUG

TECHNICAL FIELD

Example embodiments generally relate to battery powered vehicles and, more particularly, some embodiments relate to a battery powered yard maintenance vehicle having an immobilizing charger plug.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

Rising fuel costs and an increased awareness of pollution and other byproducts of fossil fuel burning engines have generated much interest in the development of cleaner energy sources. Battery powered vehicles have a potential for reducing dependence on fossil fuels. However, given the long history of development of products that burn fossil fuels, it should be appreciated that many new design considerations that were not issues previously may come into play when battery powered vehicles are employed.

BRIEF SUMMARY OF SOME EXAMPLES

Some example embodiments may provide a battery powered yard maintenance vehicle having an immobilizing charger plug. In this regard, for example, rather than enabling an operator to drive away, while a charger plug is providing battery charging services, some example embodiments may immobilize the vehicle while the charger is plugged in to prevent possible component damage.

In one example embodiment, a battery powered vehicle is provided. The battery powered vehicle may include a battery power source, an electric drive motor, a charging receptacle, and a drive controller. The electric drive motor may be powered by the battery power source. The electric drive motor may be operably coupled to a wheel of the battery powered vehicle to provide drive power for the battery powered vehicle. The charging receptacle may be configured to enable charging of the battery power source via a battery charging assembly connectable to the charging receptacle. The charging receptacle may include circuitry forming a detection loop closed responsive to operable coupling of the charging receptacle with a charger plug of the battery charging assembly. The closing of the detection loop may generate an indication that the charging receptacle is operably coupled to the charger plug. The drive controller may include processing circuitry configured to implement a mobility restriction at least with respect to operation of the electric drive motor responsive to the indication.

In another example embodiment, a drive controller for a battery powered vehicle is provided. The battery powered vehicle may include a battery power source, an electric drive motor and a charging receptacle. The electric drive motor may be powered by the battery power source. The electric drive motor may be operably coupled to a wheel of the battery powered vehicle to provide drive power for the battery powered vehicle. The charging receptacle may be configured to enable charging of the battery power source via a battery charging assembly connectable to the charging receptacle. The charging receptacle may include circuitry forming a detection loop closed responsive to operable coupling of the charging receptacle with a charger plug of the battery charging assembly. The closing of the detection loop may generate an indication that the charging receptacle is operably coupled to the charger plug. The drive controller including processing circuitry configured to implement a mobility restriction at least with respect to operation of the electric drive motor responsive to the indication.

In another example embodiment, a method of controlling a battery powered vehicle is provided. The battery powered vehicle may include a battery power source, an electric drive motor and a charging receptacle. The electric drive motor being operably coupled to a wheel of the battery powered vehicle to provide drive power for the battery powered vehicle and the charging receptacle being configured to enable charging of the battery power source via a battery charging assembly connectable to the charging receptacle. The charging receptacle may include circuitry forming a detection loop closed responsive to operable coupling of the charging receptacle with a charger plug of the battery charging assembly. The closing of the detection loop may generate an indication that the charging receptacle is operably coupled to the charger plug. The method may include determining if the detection loop is closed based on whether the indication is received and implementing a mobility restriction at least with respect to operation of the electric drive motor responsive to the indication.

Some example embodiments decrease the possibility of a battery powered yard maintenance vehicle or other vehicle incurring damage to charging components.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Battery powered yard maintenance vehicles may utilize rechargeable batteries as power sources. After charging the batteries, such vehicles may provide a relatively quiet riding experience while performing yard maintenance tasks, without reliance upon fossil fuels. The batteries may be charged from any mains power supply receptacle such as, for example, three phase, 50 Hz supplies at 230V or 400V or three phase, 60 Hz supplies at 120V or 240V. In some cases, a battery charging assembly may be provided with a grounded plug that corresponds to the local mains power supply receptacle and a power converter for converting the AC mains power supplied into DC power for charging the batteries along with one or more cord sections to connect the grounded plug and power converter to a charging receptacle on the vehicle. The charging receptacle may therefore be electrically connected to the mains power supply receptacle via the battery charging assembly.

Once the batteries are charged, the corresponding vehicles may be operable. However, it is possible that the operator may forget to unplug the battery charging assembly from the charging receptacle. If the battery charging assembly is plugged into the local mains power supply receptacle and/or has a cord section tangled or wrapped around other objects, and the operator attempts to drive away without disconnecting the battery charging assembly from the charging receptacle, it is possible that that the battery charging assembly, the charging receptacle, the mains power supply receptacle or the object may be damaged.

Some example embodiments may alter the operation of a battery powered yard maintenance vehicle by preventing operation of the battery powered yard maintenance vehicle while the battery charging assembly is plugged into the charging receptacle. In this regard, for example, some example embodiments may provide a controller or other processing circuitry for use on the battery powered yard maintenance vehicle to immobilize the battery powered yard maintenance vehicle while the battery charging assembly is plugged into the charging receptacle. In some examples, a charger plug of a battery charging assembly may include circuitry to close a detection loop when the battery charging assembly is plugged into the charging receptacle of the battery powered yard maintenance vehicle. When the detection loop is closed, the battery powered yard maintenance vehicle may be unable to be driven. In this regard, for example, in some cases the battery powered yard maintenance vehicle may not be enabled to be powered on or operated in any way, while in other example cases the battery powered yard maintenance vehicle may be able to operate with respect to auxiliary functions that do not include motion of the vehicle.

Although an example embodiment is described herein in connection with a battery powered yard maintenance vehicle, it should be appreciated that example embodiments could be employed in connection with any other battery powered vehicles as well. Thus, the description herein of a battery powered yard maintenance vehicle should be seen as one example of a vehicle in which example embodiments may be employed. Other battery powered vehicles such as golf carts, automobiles, farming equipment, and/or the like, may also employ example embodiments.

Figure 1A:
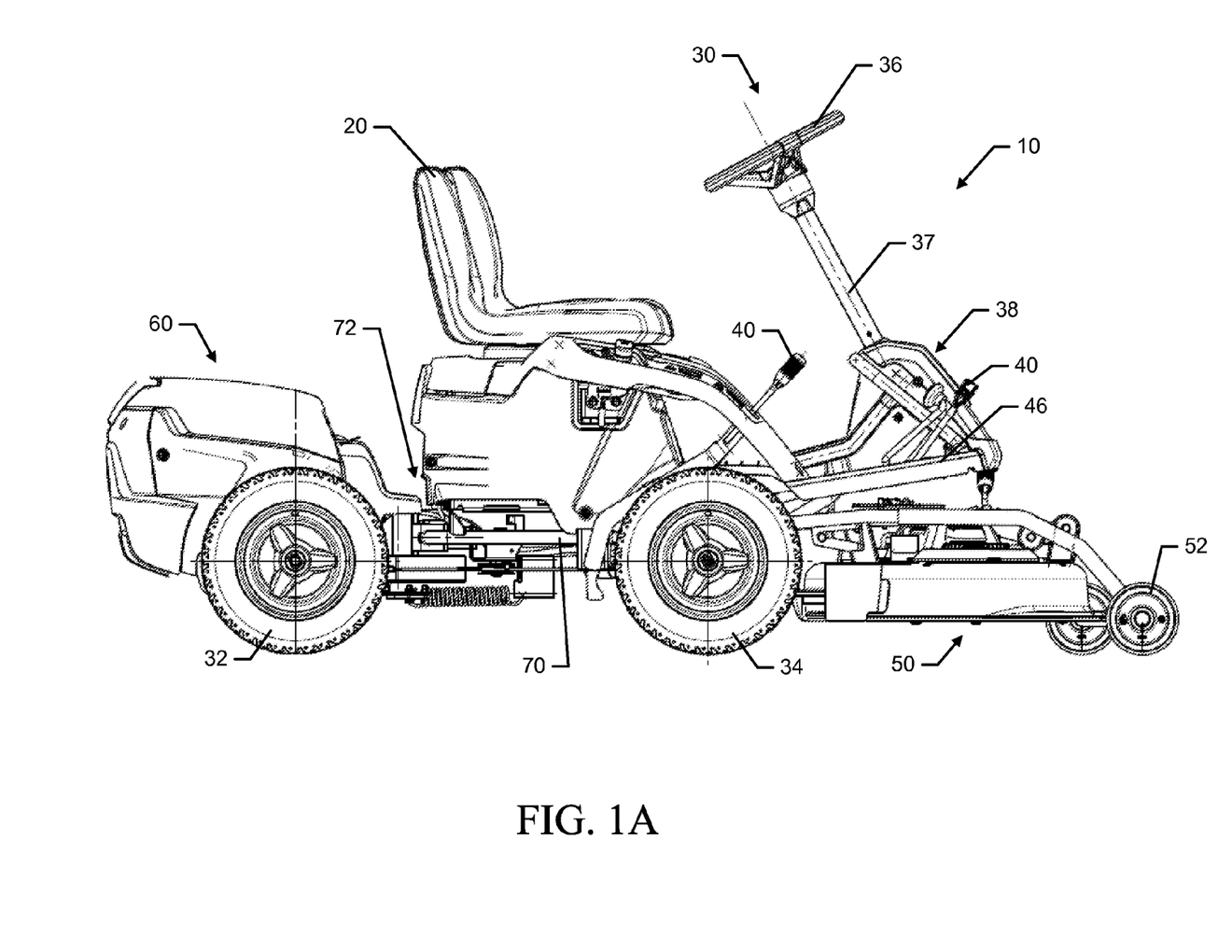
FIG. 1A illustrates a perspective view of a riding yard maintenance vehicle according to an example embodiment.
Figure 1B:
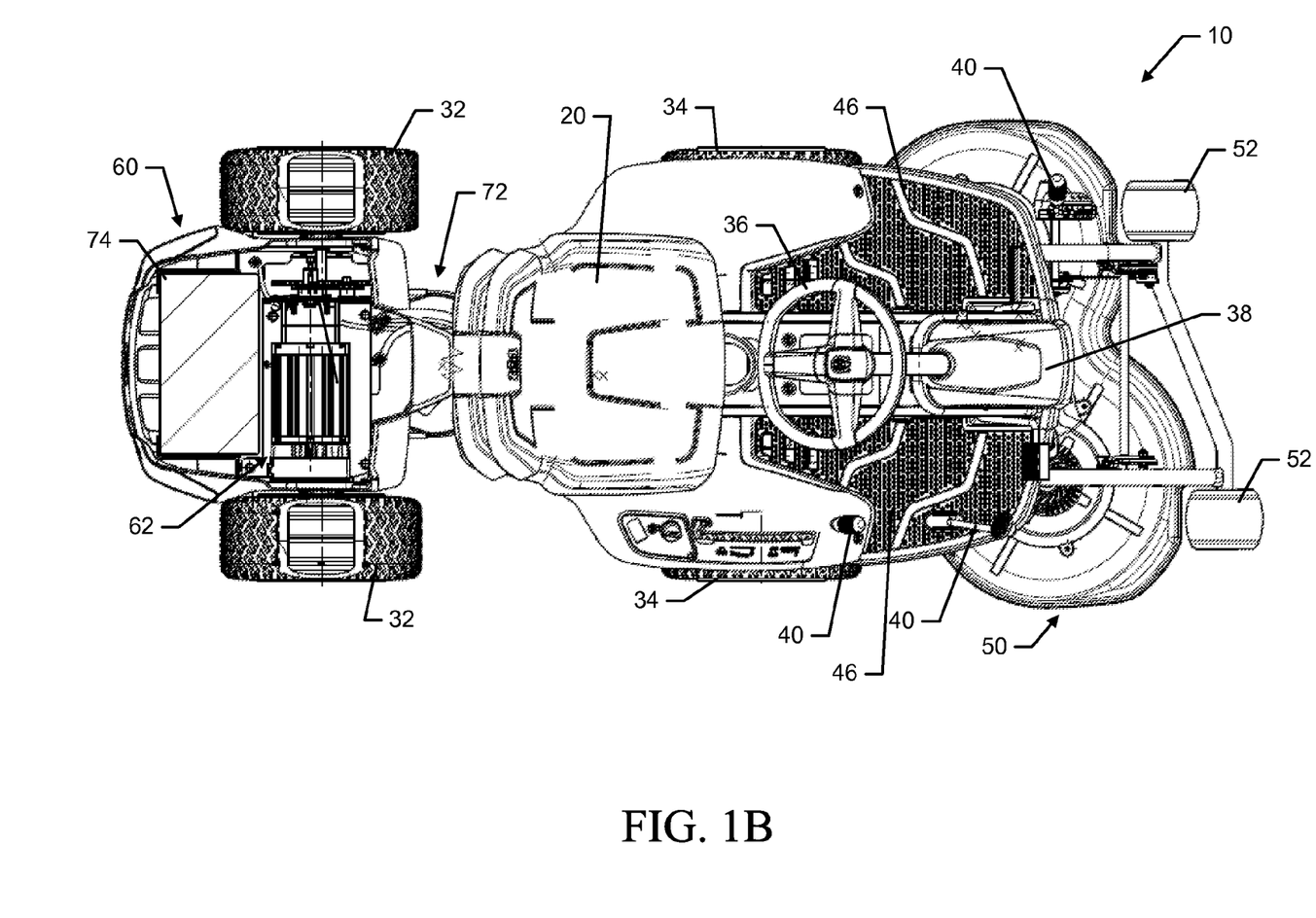
FIG. 1B illustrates a top view of the riding yard maintenance vehicle according to an example embodiment.

FIG. 1, which includes FIGS. 1A and 1B, illustrates a battery powered riding yard maintenance vehicle 10 having charge-related immobility features provided according to an example embodiment. In this regard, FIG. 1A illustrates a side view of the battery powered riding yard maintenance vehicle 10 according to an example embodiment, and FIG. 1B illustrates a top view of the battery powered riding yard maintenance vehicle 10 according to an example embodiment. In some embodiments, the battery powered riding yard maintenance vehicle 10 may include a seat 20 that may be disposed at a center, rear or front portion of the battery powered riding yard maintenance vehicle 10. The battery powered riding yard maintenance vehicle 10 may also include a steering assembly 30 (e.g., a steering wheel, handle bars, or the like) functionally connected to the wheels of the battery powered riding yard maintenance vehicle 10 to which steering inputs are provided. In some cases, the steering inputs may be provided to rear wheels 32 of the battery powered riding yard maintenance vehicle 10 to allow the operator to steer the battery powered riding yard maintenance vehicle 10. Since steering control is provided to the rear wheels 32, the front wheels 34 may not receive steering inputs in some embodiments. The operator may sit on the seat 20, which may be disposed to the rear of the steering assembly 30 to provide input for steering of the battery powered riding yard maintenance vehicle 10 via the steering assembly 30.

In an example embodiment, the steering assembly 30 may include a steering wheel 36 and a steering column 37. The steering column 37 may operably connect to additional steering assembly components to enable the battery powered riding yard maintenance vehicle 10 to move directionally based on operation of the steering wheel 36. Moreover, in some embodiments, the steering column 37 may extend into a steering console 38, which may provide a cover to improve the aesthetic appearance of the battery powered riding yard maintenance vehicle 10 by obscuring the view of various mechanical components associated with the steering assembly 30. The battery powered riding yard maintenance vehicle 10 may also include additional control related components 40 such as one or more speed controllers, cutting height adjusters and/or cutting unit lifting controllers. Some of these controllers may be provided in the form of foot pedals that may sit proximate to a footrest 46 (which may include a portion on both sides of the battery powered riding yard maintenance vehicle 10 (e.g., on opposite sides of the steering console 38)) to enable the operator to rest his or her feet thereon while seated in the seat 20.

In some example embodiments, the steering assembly 30 may be embodied as an assembly of metallic or other rigid components that may be welded, fitted, bolted or otherwise operably coupled to each other and coupled to the wheels (rear wheels 32 in this example) of the battery powered riding yard maintenance vehicle 10 to which steering inputs are provided. For example, the steering assembly 30 may include or otherwise be coupled with a steering cable assembly or a system of mechanical linkages to translate rotational motion applied to the steering assembly 30 (and more particularly to the steering wheel 36) into directional inputs to orient the wheels (e.g., rear wheels 32) accordingly. In the illustrated embodiment, the riding lawn mower has an articulated frame 70 where the front wheels 34 are rotatably mounted to a front frame portion and the rear wheels 32 are rotatably mounted to a rear frame portion. The rear frame portion and the front frame portion are joined at articulated joint 72 so that the rear frame portion can pivot with respect to the front frame portion in response to steering input in order to reorient the rear wheels 32 relative to the front wheels 34. Other steering control systems may be employed in some alternative embodiments.

Figure 2:
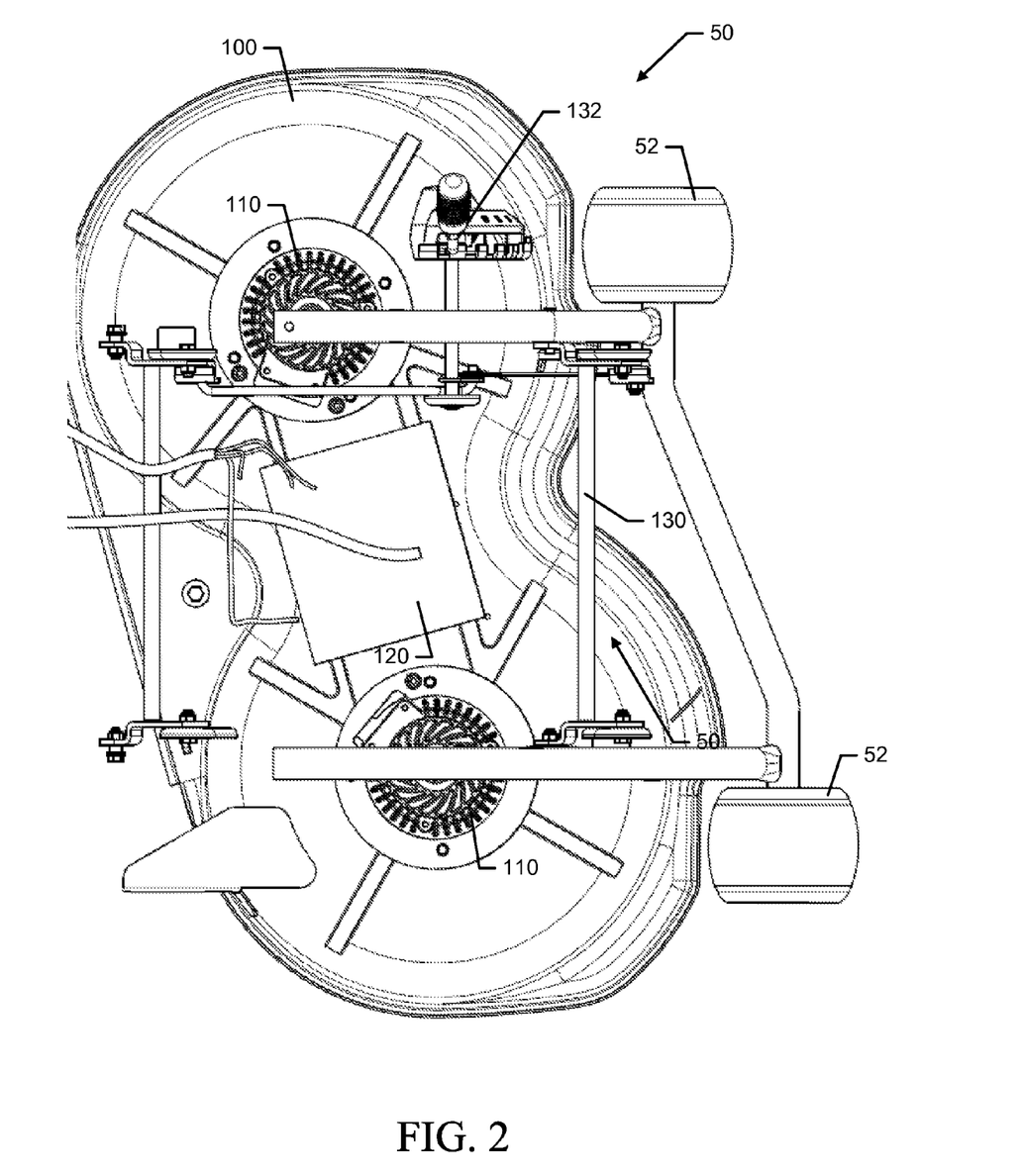
FIG. 2 illustrates portions of a cutting deck of the riding yard maintenance vehicle according to an example embodiment.

The battery powered riding yard maintenance vehicle 10 may also include, or be configured to support attachment of, a cutting deck 50 having at least one cutting blade mounted therein. FIG. 2 illustrates portions of the cutting deck 50 according to an example embodiment. The cutting deck 50 may be a removable attachment that may be positioned in front of the front wheels 34 in a position to enable the operator to cut grass using the cutting blade when the cutting blade is rotated below the cutting deck 50 and the cutting deck 50 is in a cutting position. When operating to cut grass, the grass clippings may be captured by a collection system, mulched, or expelled from the cutting deck 50 via either a side discharge or a rear discharge.

In some embodiments, the cutting deck 50 may be elevated or lifted out of direct contact with the ground via a cutting unit lifting controller. In this regard, the cutting unit lifting controller may be a foot pedal or hand operated lever that operates linkages to lift or tilt the cutting deck 50 upward. Lifting the cutting deck 50 may enable the battery powered riding yard maintenance vehicle 10 to traverse certain rough terrain or obstacles (e.g., small rocks, curbs, or other features) or may otherwise be preferable for some operators when in a transit mode, or when the battery powered riding yard maintenance vehicle 10 is not actively being used in a cutting operation. However, other embodiments may not include any such cutting deck 50 lifting option, but may simply allow the height of blades within the cutting deck 50 to be adjusted using a cutting height adjuster (e.g., adjuster 132 in FIG. 2). In this regard, the cutting height adjuster may be a lever that is operably connected to the blades via linkages (not shown in FIG. 1) to adjust the height of the blades relative to the ground when the cutting deck 50 is lowered into a cutting position. In some embodiments, the cutting deck 50 itself may include wheels 52 to help ensure that the cutting deck 50 stays relatively level during operation to provide an even cut.

In embodiments in which the cutting deck 50 is removable, the cutting deck 50 may include blade drive components (e.g., belts, pulleys, a blade motor or other components) that may be used to functionally operate the cutting deck 50 during a cutting operation. The cutting deck 50 may mate with a portion of the battery powered riding yard maintenance vehicle 10 via a cutting deck mounting assembly configured to mate with the battery powered riding yard maintenance vehicle 10 to join the cutting deck 50 to the battery powered riding yard maintenance vehicle 10 to enable the cutting deck 50. FIG. 1 illustrates the battery powered riding yard maintenance vehicle 10 with the cutting deck 50 attached.

In the pictured example embodiment of FIG. 1, drive motor compartment 60 of the battery powered riding yard maintenance vehicle 10 may be disposed to the rear of a seated operator to house various components of the battery powered riding yard maintenance vehicle 10 including an electric drive motor 62. However, in other example embodiments, the drive motor compartment 60 could be in different positions such as in front of the operator or below the operator. In some embodiments, the electric drive motor 62 may be operably coupled to one or more of the wheels of the battery powered riding yard maintenance vehicle 10 (the rear wheels 32 in this example) in order to provide drive power for the battery powered riding yard maintenance vehicle 10. Although the electric drive motor 62 may be capable of powering the rear wheels 32, in other alternative embodiments, the electric drive motor 62 may power all four wheels of the battery powered riding yard maintenance vehicle 10 (e.g., in cases where the battery powered riding yard maintenance vehicle 10 is not articulated). Moreover, in some cases, the electric drive motor 62 may manually or automatically shift between powering either one, two, three or all four wheels of the battery powered riding yard maintenance vehicle 10.

In an example embodiment, the electric drive motor 62, the steering assembly 30, the cutting deck 50, the seat 20 and other components of the battery powered riding yard maintenance vehicle 10 may be operably connected (directly or indirectly) to a frame 70 of the battery powered riding yard maintenance vehicle 10. The frame 70 may be a rigid structure configured to provide support, connectivity and interoperability functions for various ones of the components of the battery powered riding yard maintenance vehicle 10. In some embodiments, the frame 70 may be split or articulated such that, for example, the front wheels 34 are disposed on an opposite portion of the frame 70 than the portion of the frame on which the back wheels 32 are disposed with respect to an articulated joint 72 in the frame 70.

The battery powered riding yard maintenance vehicle 10 may also include a battery power source 74. The battery power source 74 may include one or more batteries that may provide power for all electrical components of the battery powered riding yard maintenance vehicle 10. In cases in which multiple batteries are combined to form the battery power source 74, the batteries may be distributed or collocated near one another. In an example embodiment, three twelve volt batteries may be employed connected in series and their locations may be distributed throughout the battery powered riding yard maintenance vehicle 10. For example, one or more batteries may be disposed in the drive motor compartment 60, while other batteries may be disposed under the seat 20 or in other locations of the battery powered riding yard maintenance vehicle 10. The battery power source 74 may include lead acid batteries, Lithium-ion batteries, Nickel-Cadmium batteries, or other types of batteries, and may be rechargeable or disposable in various alternative embodiments. By employing the battery power source 74, the battery powered riding yard maintenance vehicle 10 may avoid using fossil fuels and/or operate with reduced overall noise.

Referring now to FIG. 2, the cutting deck 50 (viewed from above in FIG. 2) may include a blade housing 100 that may house one or more cutting blades (not shown). The cutting blades may turn responsive to rotary motive forces applied by corresponding one or more electric blade drive motors 110. In some examples, there may be one blade motor provided for each blade. However, other embodiments could use a single blade motor to turn multiple blades. In the example of FIG. 2, there are two blade drive motors 110 shown for turning two corresponding blades within the blade housing, but other embodiments may employ less or more blades and corresponding blade motors. The blade motors 110 may be controlled via one or more blade motor controllers 120. In some examples, the blade motor controllers 120 may be disposed substantially between the blade motors 110 and may receive power from the battery power source 74.

A cutting deck mounting assembly 130 may be provided for attachment of the cutting deck 50 to the battery powered riding yard maintenance vehicle 10. The cutting deck mounting assembly 130 may suspend the blade housing (and therefore also the cutting blades) relative to the ground. In some embodiments, the cutting deck mounting assembly 130 may be supported by the wheels 52 of the cutting deck 50 and/or by attachment to the battery powered riding yard maintenance vehicle 10. In an example embodiment, adjuster 132 may be utilized to change the height of the cutting blades via adjustment of the distance between the cutting deck mounting assembly 130 and the blade housing 100.

Figure 3:
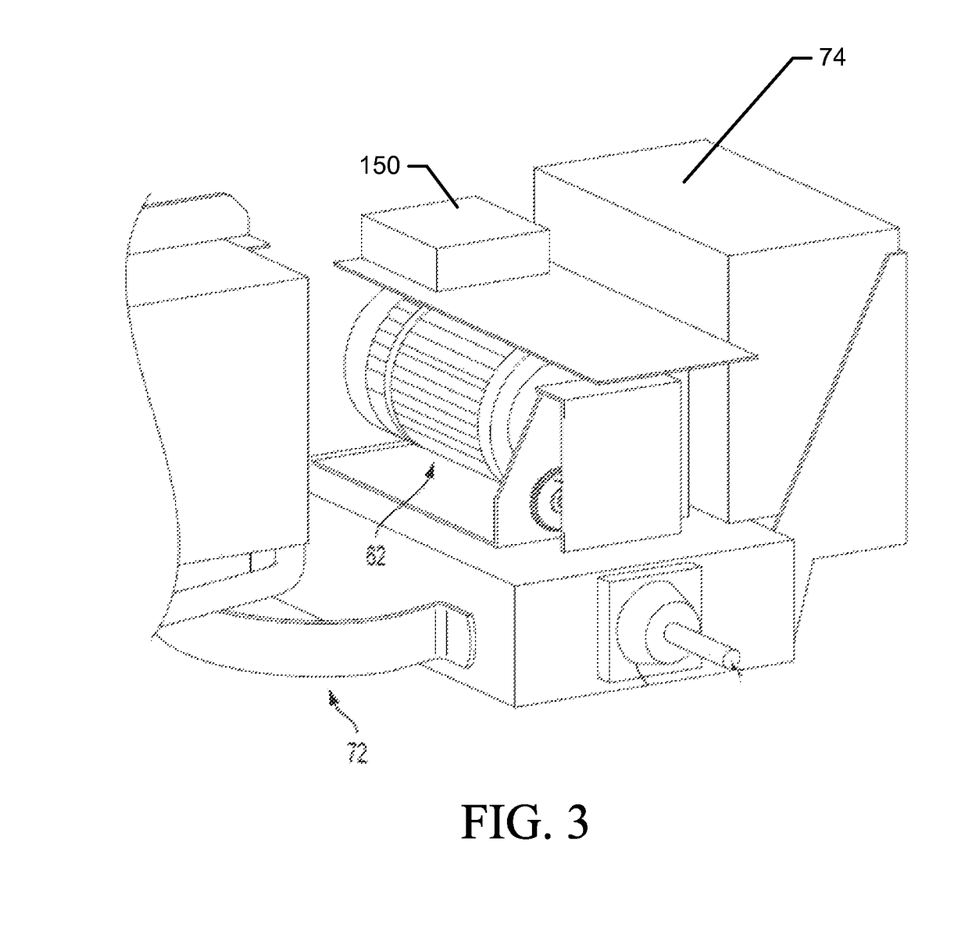
FIG. 3 illustrates a perspective view of some components of the riding yard maintenance vehicle according to an example embodiment.

In an example embodiment, controllers for both the blade motors 110 and the motor controller for the electric drive motor 62 may be powered from the battery power source 74. Current drawn from the battery power source 74 and various other operating parameters associated with operation of components of the battery powered riding yard maintenance vehicle 10 may be monitored by one or more sensors of a sensor network. The sensor network may include a plurality of sensors disposed in corresponding locations and configured to detect parameters associated with various operational conditions related to the battery powered riding yard maintenance vehicle 10. Parametric data gathered by the sensor network may then be provided to a drive controller 150 that may be configured to process the parametric data and control operation of the blade motors 110 and the electric drive motor 62 based at least in part on the parametric data received. In some cases, the drive controller 150 may also receive user inputs including drive related inputs (e.g., accelerator inputs, brake inputs, user interface inputs) and therefore provide for vehicle control based on various combinations of operational parameters and user inputs. Although the drive controller 150 may be disposed nearly anywhere on the battery powered riding yard maintenance vehicle 10, one example embodiment may provide the drive controller 150 in a location proximate to the battery power source 74. For example, FIG. 3 illustrates a perspective view of some of the components of the battery powered riding yard maintenance vehicle 10. In this regard, FIG. 3 shows the drive controller 150 disposed between two batteries of the battery power source 74 on top of the electric drive motor 62.

In an example embodiment, the drive controller 150 and sensor network may include one or more current sensors configured to detect the total current drawn from the battery power source 74. Accordingly, for example, in some cases a single current sensor may be used to detect the total current drawn from the battery power source 74. However, in other examples, multiple current sensors may be provided to detect different component currents that may be summed to determine the total current drawn by the battery power source 74. In some cases, the current sensor (or sensors) may be embodied as a voltage sensor measuring voltage across a resistor (e.g., a shunt resistor) of a known value. As such, the voltage measured may be indicative of the corresponding current. The sensor network may also sense other parameters such as the presence of an operator on the seat 20, blade motor running status (e.g., for determining working time), drive motor running status (e.g., for determining drive time), and various fault conditions that may impact battery powered riding yard maintenance vehicle 10 operation. Furthermore, in an example embodiment, the sensor network may sense parameters such as the condition of a battery charger plug being plugged into a charging receptacle of the battery powered riding yard maintenance vehicle 10.

Figure 4:
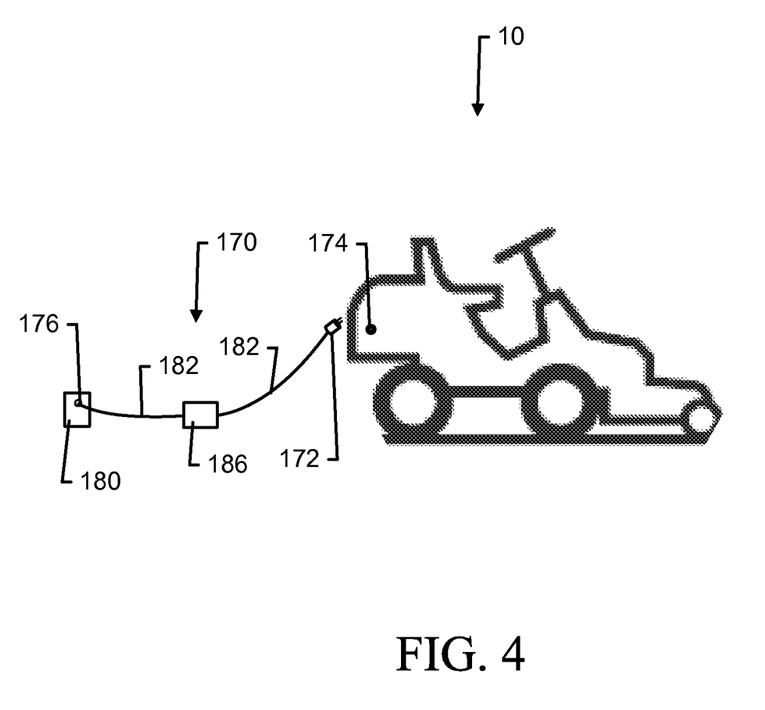
FIG. 4 illustrates a diagram of a battery charging assembly that may be employed to charge a battery or batteries of the riding yard maintenance vehicle according to an example embodiment.

FIG. 4 illustrates a diagram of a battery charging assembly 170 that may be employed to charge the battery or batteries of the battery powered riding yard maintenance vehicle 10. The battery charging assembly 170 may include a charger plug 172 that may be configured to fit into and/or mate with a charging receptacle 174 of the battery powered riding yard maintenance vehicle 10. In an example embodiment, the battery or batteries of the battery powered riding yard maintenance vehicle 10 may be electrically connected to the charging receptacle 174 to enable electrical energy to be transferred into the battery or batteries of the battery powered riding yard maintenance vehicle 10 from a mains power receptacle 176 via the battery charging assembly 170. The battery charging assembly 170 may include a grounded plug 180 that mates with the mains power receptacle 176 when plugged therein. The battery charging assembly 170 may also include one or more cord sections 182 that include wiring to provide a path to pass electrical energy from the grounded plug 180 to the charger plug 172 when the grounded plug 180 is connected to the mains power receptacle 176. In some embodiments, the battery charging assembly 170 may further include a power converter 186 for converting AC mains power into DC power for charging the battery or batteries of the battery powered riding yard maintenance vehicle 10. Thus, when the grounded plug 180 is plugged into the mains power receptacle 176 and the charger plug 172 is plugged into the charging receptacle 174 of the battery powered riding yard maintenance vehicle 10, the battery or batteries of the battery powered riding yard maintenance vehicle 10 may be charged. However, as described in greater detail below, responsive to an indication that the charger plug 172 is plugged into the charging receptacle 174, the battery powered riding yard maintenance vehicle 10 may be immobilized. Such immobilization may prevent the battery charging assembly 170 from being dragged (and perhaps damaged) if the battery powered riding yard maintenance vehicle 10 drives away while the charger plug 172 is plugged into the charging receptacle 174. The immobilization may also prevent damage to the charger plug 172, the mains power receptacle 176, the grounded plug 180, the charging receptacle 174, or other objects with which the cord sections 182 may be entangled if the battery powered riding yard maintenance vehicle 10 drives away while the charger plug 172 is plugged into the charging receptacle 174.

In some embodiments, the battery charging assembly 170 may not include the power converter 186, but instead power conversion may be performed within the battery powered riding yard maintenance vehicle 10 itself. Thus, for example, the battery charging assembly 170 may include only cord and the corresponding grounded plug 180 and charger plug 172. Furthermore, it should be appreciated that the charging receptacle 174 may be embodied as a plug that mates with the charger plug 172 (e.g., via male to female connections where either of the charger plug 172 or the charging receptacle 174 may have the male fitting and the other of the charger plug 172 or the charging receptacle 174 may have the female fitting). Alternatively, the charging receptacle 174 may be embodied as an outlet into which the charger plug 172 may be plugged. In any case, however, the charger plug 172 may complete a detection loop when mated with the charging receptacle 174 as described in greater detail below.

Figure 5:
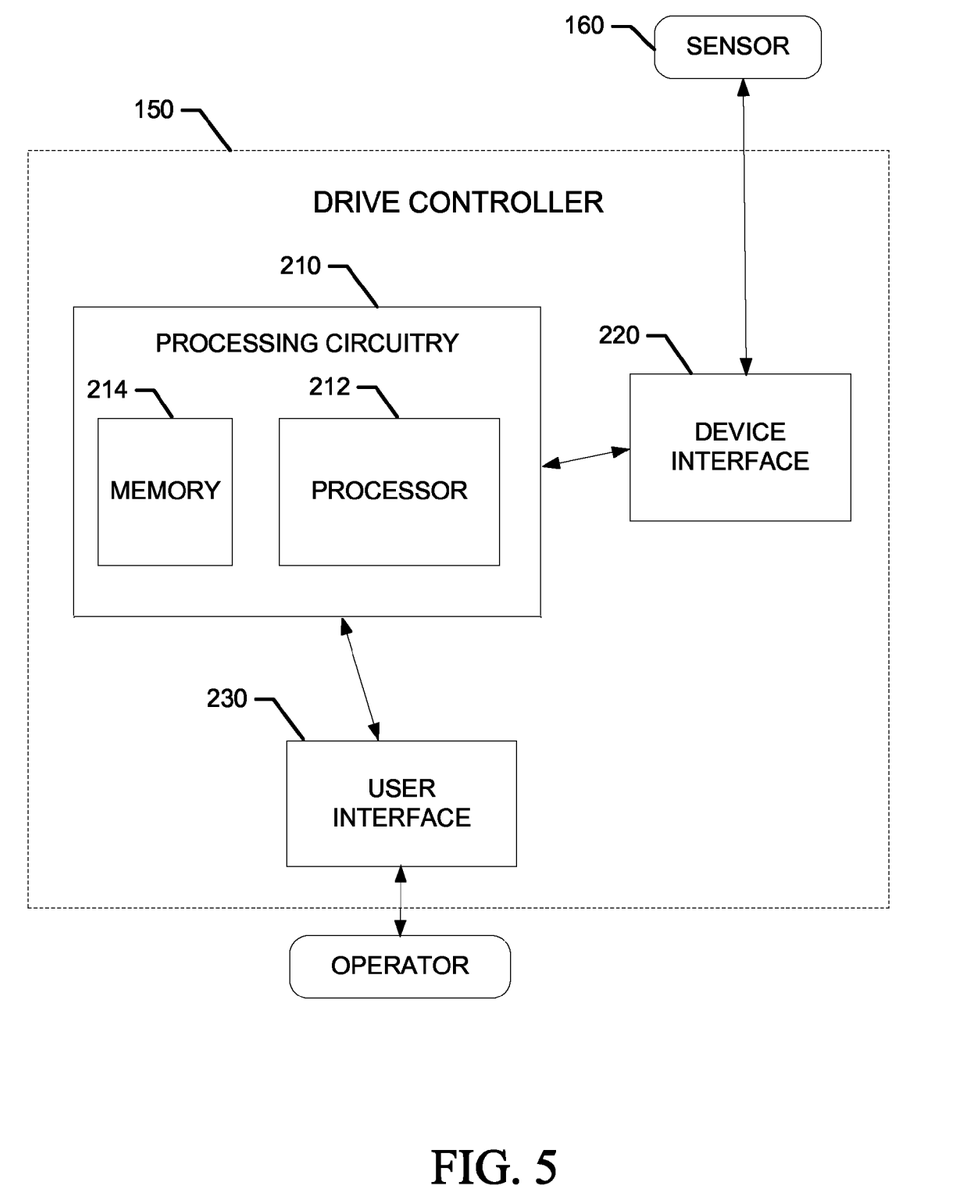
FIG. 5 illustrates a block diagram of various components of the battery powered riding yard maintenance vehicle according to an example embodiment.

FIG. 5 illustrates a block diagram of various components of the battery powered riding yard maintenance vehicle 10 to illustrate operable coupling provided between various ones of such components and to facilitate description of an example embodiment. In some example embodiments, the drive controller 150 may include or otherwise be in communication with processing circuitry 210 that is configurable to perform actions in accordance with example embodiments described herein. As such, for example, the functions attributable to the drive controller 150 may be carried out by the processing circuitry 210.

The processing circuitry 210 may be configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include a processor 212 and memory 214 that may be in communication with or otherwise control a device interface 220 and, in some cases, a user interface 230. As such, the processing circuitry 210 may be embodied as a circuit chip (e.g., an integrated circuit chip) configured (e.g., with hardware, software or a combination of hardware and software) to perform operations described herein. However, in some embodiments, the processing circuitry 210 may be embodied as a portion of an on-board computer.

The user interface 230 (if implemented) may be in communication with the processing circuitry 210 to receive an indication of a user input at the user interface 230 and/or to provide an audible, visual, mechanical or other output to the user. As such, the user interface 230 may include, for example, a display (e.g., a touch screen), one or more buttons or keys, and/or other input/output mechanisms. In some embodiments, the user interface 230 may be provided on a fender panel (e.g., positioned proximate to the seat 20), on a portion of the steering console 38, or at another location on the battery powered riding yard maintenance vehicle 10.

The device interface 220 may include one or more interface mechanisms for enabling communication with other devices (e.g., sensors of the sensor network and/or motor controllers of the blade motors 110 and/or the electric drive motor 62). In some cases, the device interface 220 may include wireless communication components (e.g., an antenna and transmission/reception circuitry) to enable wireless communication messages to be transmitted by the drive controller 150 to designated devices. In an example embodiment, the device interface 220 may be any means such as a device or circuitry embodied in either hardware, or a combination of hardware and software that is configured to receive and/or transmit data from/to sensors (e.g., sensor 160), external or internal components, and/or motor controllers in communication with the processing circuitry 210. In an example embodiment, the sensor 160 may be embodied as a charging plug insertion detector configured to detect when the charger plug 172 of the battery charging assembly 170 is plugged into the charging receptacle 174 of the battery powered riding yard maintenance vehicle 10. In an example embodiment, the charging plug insertion detector may include a detection loop that is closed (e.g., by the charger plug 172) when the battery charging assembly 170 is plugged into the charging receptacle 174 of the battery powered riding yard maintenance vehicle 10.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the drive controller 150 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 114 may include one or more databases that may store a variety of data sets responsive to input from the sensor network. Among the contents of the memory 214, applications may be stored for execution by the processor 212 in order to carry out the functionality associated with each respective application. In some cases, the applications may include control applications that utilize parametric data to control the electric drive motor 62 as described in greater detail below.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the drive controller 150. As such, in some embodiments, the processor 212 (or the processing circuitry 210) may be said to cause each of the operations described in connection with the drive controller 150 by directing the drive controller 150 to undertake the corresponding functionalities responsive to execution of instructions or algorithms configuring the processor 212 (or processing circuitry 210) accordingly. As an example, the drive controller 150 may be configured to control powering up of the battery powered riding yard maintenance vehicle 10 or the application of current to the electric drive motor 62 as described herein.

The drive controller 150 may be capable of providing control signals to the electric drive motor 62 in accordance with control applications and/or instructions defining parametric inputs and corresponding control actions to be taken for certain parametric input signals or combinations thereof. In an example embodiment, the drive controller 150 may be configured to receive an indication or signal indicating that the charger plug 172 of the battery charging assembly 170 is inserted into the charging receptacle 174 of the battery powered riding yard maintenance vehicle 10. The drive controller 150 may then be configured to provide for immobilization of the battery powered riding yard maintenance vehicle 10 when the indication or signal is received. In some cases, the drive controller 150 may provide for immobilization of the battery powered riding yard maintenance vehicle 10 by preventing driving current or voltage from being applied to the electric drive motor 62. Thus, for example, current may be provided to auxiliary functions or components such as lights, vehicle information systems and/or the like, but may not be provided for movement of the vehicle. As an alternative, the drive controller 150 may be configured to prevent power up of the battery powered riding yard maintenance vehicle 10, or at least prevent the application of power to both the auxiliary functions and the electric drive motor 62. However, in some cases, the drive controller 150 may selectively enable certain ones of the auxiliary functions to be powered up, while certain other auxiliary functions are not enabled along with immobilization of the battery powered riding yard maintenance vehicle 10.

In some embodiments, the drive controller 150 may further provide for immobilization of the battery powered riding yard maintenance vehicle 10 by activating one or more brakes (such as the parking brake) when the charger plug 172 of the battery charging assembly 170 is inserted into the charging receptacle 174. For example, the parking brake may be configured so that it can be engaged electronically via vehicle circuitry of a brake controller. The drive controller 150 could communicate to the brake controller that the brake should be engaged in response to the charger plug 172 being inserted into the charging receptacle 174. Similarly, the drive controller 150 may be configured to communicate with a brake controller to prevent deactivation of one or more brakes that were activated by an operator prior to connection of the charger plug 172 to the charging receptacle 174.

Figure 6:
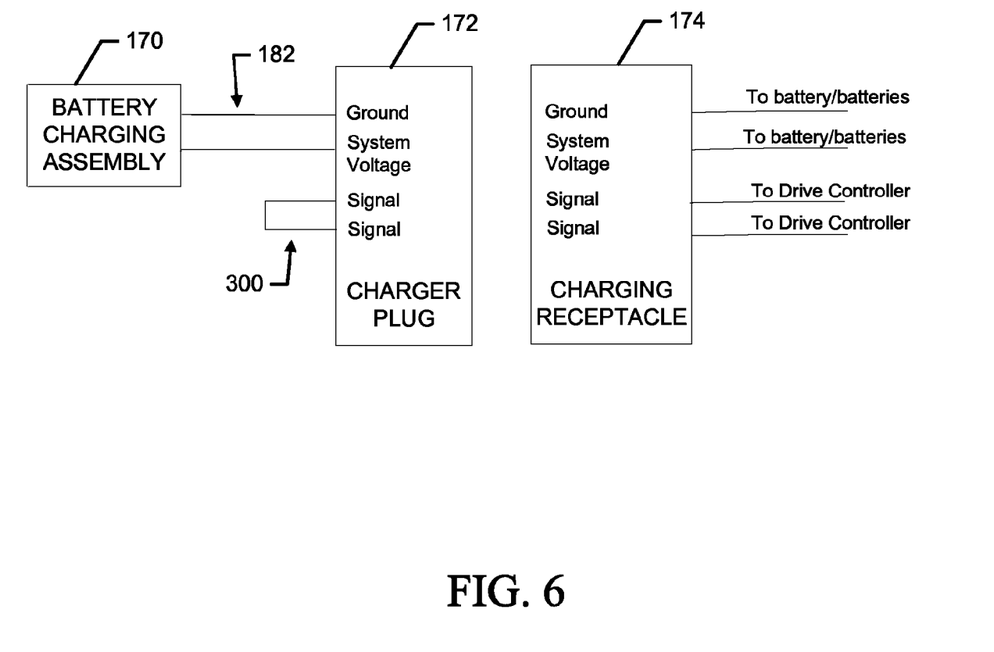
FIG. 6 illustrates components associated with completing a detection loop for detecting charging plug connection to a charging receptacle according to an example embodiment.

FIG. 6 illustrates components associated with completing a detection loop for detecting charging plug 172 connection to the charging receptacle 174 according to an example embodiment. As shown in FIG. 6, the battery charging assembly 170 may terminate at the charger plug 172. The cord section 182 may include wires for feeding ground and system voltage to the charger plug 172. The charger plug 172 may also include detection loop completion circuitry 300. Meanwhile, the charging receptacle 174 may, when mated with the charger plug 172, receive the ground and system voltage inputs from the charger plug 172 and pass those inputs on to the battery or batteries of the battery powered riding yard maintenance vehicle 10. The charging receptacle 174 may also include electrical contacts for mating with the charger plug 172 to complete a detection loop 310 comprising circuitry providing a charger plug insertion condition indication to the drive controller 150 responsive to closure of the detection loop 310. In this regard, for example, when the charger plug 172 mates with the charging receptacle 174, the loop completion circuitry 300 may complete or close the detection loop 310 and provide a signal or indication to the drive controller 150 to indicate that the charger plug 172 is mated with the charging receptacle 174. When the charger plug 172 is not mated or fully seated in contact with the charging receptacle 174, the detection loop 310 may remain an open circuit and no signal or indication may be provided to the drive controller 150 to indicate that the charger plug 172 is mated with the charging receptacle 174.

Completion of the detection loop, and the generation of the signal or indication, may be used by the drive controller 150 to immobilize the battery powered riding yard maintenance vehicle 10. However, when the detection loop remains an open circuit, the drive controller 150 may not inhibit operation of the battery powered riding yard maintenance vehicle 10. By providing the loop completion circuitry 300, e.g., as a wired loop to complete the detection loop 310, the detection loop 310 may be completed even if the ground plug 170 is not plugged into the mains power receptacle 176. Thus, the drive controller 150 may determine whether the charger plug 172 is connected to the charging receptacle 174 independent of whether any power is actually being received from the charger plug 172.

Figure 7:
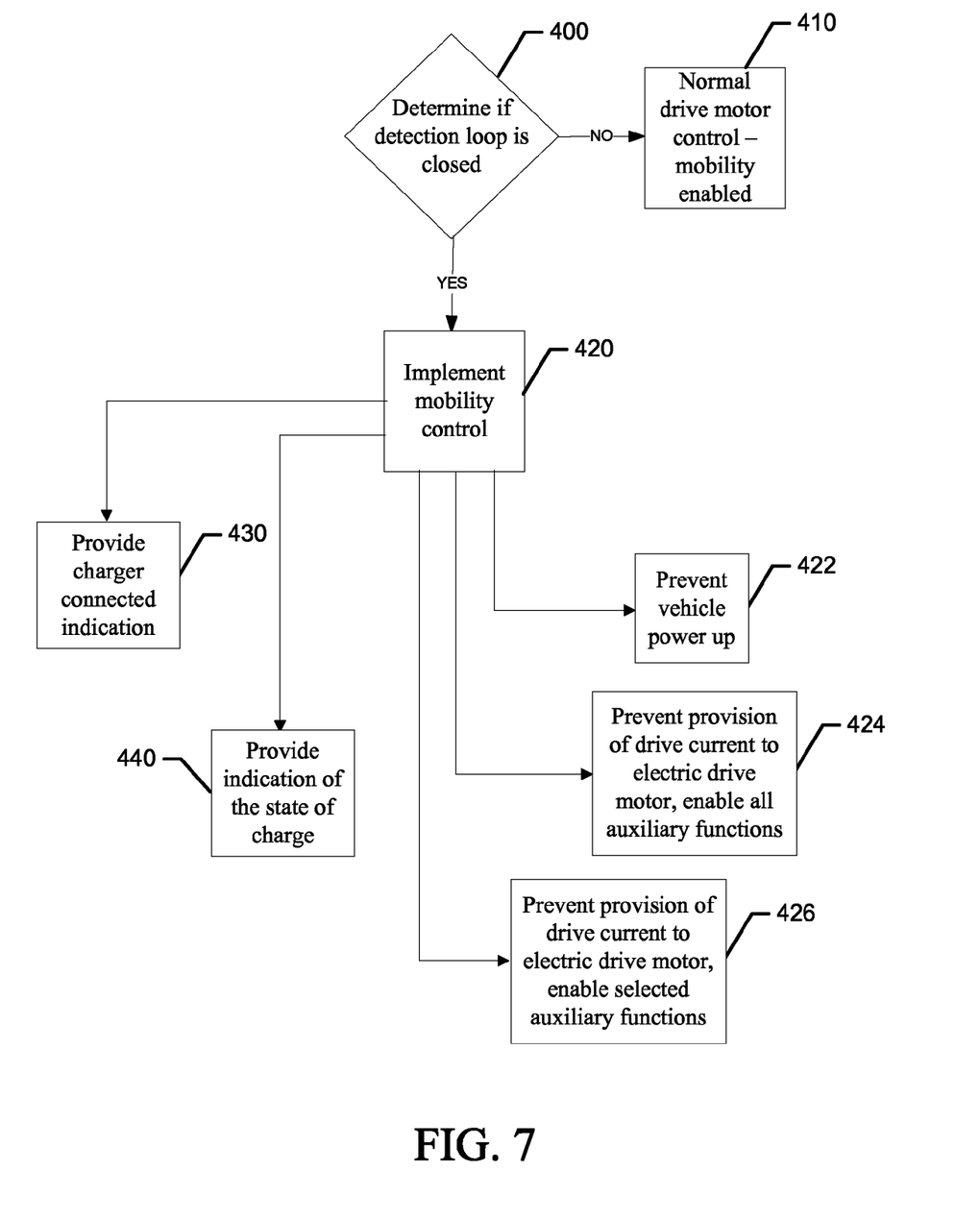
FIG. 7 is a block diagram illustrating a method of controlling the battery powered vehicle according to an example embodiment.

FIG. 7 illustrates a block diagram showing operation of the drive controller 150 according to an example embodiment. As shown in FIG. 7, a determination may be made as to whether the detection loop is closed at operation 400. If the detection loop is not closed, the drive controller may enable mobility related operations of the battery powered riding yard maintenance vehicle 10 at operation 410. If, on the other hand, the detection loop is closed, the drive controller 150 may implement mobility control at operation 420. Mobility control may be implemented in any of a variety of ways. Some examples of mechanisms by which mobility control may be implemented are shown as alternatives in FIG. 7. However, it should be appreciated that some example embodiments may only include one of the example mechanisms shown. Meanwhile, other example embodiments may employ all or less than all of the mechanisms shown, while still other example embodiments may employ other mechanisms that are not shown in FIG. 7 either alone or in combination with one or more of the mechanisms shown in FIG. 7. Furthermore, in some cases, the drive controller 150 may employ a selected one of the example mechanisms shown (or another mechanism) based on current conditions detected by the drive controller 150 (e.g., via the sensor network). In such an example, the selection of one or more mechanisms for employing mobility restrictions may be made flexible and responsive to user input. For example, certain inputs or combinations of inputs provided by the operator (e.g., via the user interface 230 or via pedals and/or controllers of the battery powered riding yard maintenance vehicle 10) may direct the drive controller 150 to enable certain auxiliary functions, while maintaining mobility restrictions. However, absent the certain inputs or combinations of inputs, the drive controller 150 may not allow even those auxiliary functions to be enabled or powered up.

In this regard, in some embodiments, the drive controller 150 may prevent powering up of the battery powered riding yard maintenance vehicle 10 at operation 422. In some cases, the drive controller 150 may prevent the provision of driving current to the electric drive motor 62, but may otherwise provide current for operation of other auxiliary systems at operation 424. In still other example embodiments, the drive controller 150 may prevent provision of driving current to the electric drive motor 62, but provide current for operation of selected auxiliary systems at operation 426. In some embodiments, although not required, the drive controller 150 may provide a charger connected indication (e.g., via a light, display icon or other indicator associated with the user interface 230) at operation 430 to inform the operator that the charger plug 172 is mated with the charging receptacle 174, and mobility restrictions are being enforced. In still other embodiments, the drive controller 150 may be further configured to receive an input indicative of a state of charge of the battery or batteries and provide an indication of the state of charge to the operator at operation 440. In some embodiments, the state of charge may be displayed at the user interface 230. However, in some embodiments, a message (e.g., an email, text message or other wirelessly transmitted message) may be provided from the drive controller 150 to the operator (e.g., to a cell phone, computer, or other mobile or personal device of the operator) to indicate the state of charge. The message may be provided at various time intervals (standard or user selected) in order to indicate the state of charge over time, or the message may only be sent when charging is complete (i.e., the battery is fully charged). In some example embodiments, however, the message may further indicate an interruption in charging (e.g., if power is lost due to a power outage or removal of the connection between the charger plug 172 and the charging receptacle 174. In some embodiments, in response to the connecting of the charger plug 172 to the charging receptacle, the vehicle's controller may activate a wireless communication device (e.g., a local area network device, a cellular device, a radio frequency transceiver, and/or the like) to permit connection to the operator's personal device via a local area network, global area network, the Internet, and/or the like and/or to begin periodic reporting of battery state to the operator.

Accordingly, some example embodiments of the present invention may provide a drive controller that may be enabled to protect charging components by preventing movement of a battery powered vehicle while the vehicle is connected to its charging assembly (whether or not the charging assembly is plugged into mains power). In this regard, the charging assembly may be provided with a charger plug that completes a detection loop that provides an indication of charger plug connection to a charging receptacle of the vehicle to direct immobilization of the vehicle. Thus, immobilization of the vehicle may be employed to prevent the vehicle from driving off with the charger plug still attached thereto.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A battery powered vehicle comprising:
    a battery power source;
    an electric drive motor powered by the battery power source, the electric drive motor being operably coupled to a wheel of the battery powered vehicle to provide drive power for the battery powered vehicle;
    a charging receptacle configured to enable charging of the battery power source via a battery charging assembly connectable to the charging receptacle, the charging receptacle comprising circuitry forming a detection loop closed responsive to operable coupling of the charging receptacle with detection loop completion circuitry provided in a charger plug of the battery charging assembly, closing of the detection loop generating an indication that the charging receptacle is operably coupled to the charger plug; and
    a drive controller comprising processing circuitry configured to implement a mobility restriction at least with respect to operation of the electric drive motor responsive to the indication,
    wherein the detection loop completion circuitry is configured to complete a signal path from the drive controller to the charger plug and back to the drive controller, that implements the mobility restriction and enables operation of at least one auxiliary function.

2. The battery powered vehicle of claim 1, wherein the drive controller is configured to implement the mobility restriction independent of whether electrical power is being provided to the battery powered vehicle by the charger plug.

3. The battery powered vehicle of claim 1, wherein the drive controller is configured to implement the mobility restriction by preventing delivery of current to the electric drive motor.

4. The battery powered vehicle of claim 1, wherein the drive controller is configured to implement the mobility restriction by preventing power up of the battery powered vehicle.

5. The battery powered vehicle of claim 1, wherein the drive controller is configured to provide a message indicating of a state of charge to an operator of the battery powered vehicle.

6. The battery powered vehicle of claim 5, wherein the drive controller is configured to wirelessly send the message to the operator.

7. The battery powered vehicle of claim 1, wherein the drive controller is configured to provide a message indicating a state of connection between the charger plug and the charging receptacle to an operator.

8. The battery powered vehicle of claim 1, wherein the detection loop comprises an open circuit that is closed by the detection loop completion circuitry of the charger plug responsive to operable coupling of the charger plug and the charging receptacle.

9. The battery powered vehicle of claim 1, wherein the battery powered vehicle is a riding yard maintenance vehicle.

10. A drive controller for a battery powered vehicle comprising a battery power source, an electric drive motor, and a charging receptacle, the electric drive motor being operably coupled to a wheel of the battery powered vehicle to provide drive power for the battery powered vehicle, and the charging receptacle being configured to enable charging of the battery power source via a battery charging assembly connectable to the charging receptacle, the charging receptacle comprising circuitry forming a detection loop closed responsive to operable coupling of the charging receptacle with detection loop completion circuitry provided in a charger plug of the battery charging assembly, closing of the detection loop generating an indication that the charging receptacle is operably coupled to the charger plug, the drive controller comprising:
    processing circuitry configured to implement a mobility restriction at least with respect to operation of the electric drive motor responsive to the indication, wherein the detection loop completion circuitry is configured to complete a signal path from the drive controller to the charger plug and back to the drive controller, that implements the mobility restriction and enables operation of at least one auxiliary function.

11. The drive controller of claim 10, wherein the processing circuitry is configured to implement the mobility restriction independent of whether electrical power is being provided to the battery powered vehicle by the charger plug.

12. The drive controller of claim 10, wherein the processing circuitry is configured to implement the mobility restriction by preventing delivery of current to the electric drive motor.

13. The drive controller of claim 10, wherein the processing circuitry is configured to implement the mobility restriction by preventing power up of the battery powered vehicle.

14. The drive controller of claim 10, wherein the processing circuitry is configured to provide a message indicating of a state of charge to an operator of the battery powered vehicle.

15. A method of controlling operation of a battery powered vehicle, the battery powered vehicle comprising a battery power source, an electric drive motor, and a charging receptacle, the electric drive motor being operably coupled to a wheel of the battery powered vehicle to provide drive power for the battery powered vehicle, and the charging receptacle being configured to enable charging of the battery power source via a battery charging assembly connectable to the charging receptacle, the charging receptacle comprising circuitry forming a detection loop closed responsive to operable coupling of the charging receptacle with detection loop completion circuitry provided in a charger plug of the battery charging assembly, closing of the detection loop generating an indication that the charging receptacle is operably coupled to the charger plug, the method comprising:
- determining if the detection loop is closed based on whether the indication is received; and
- implementing a mobility restriction at least with respect to operation of the electric drive motor responsive to the indication,
- wherein the detection loop completion circuitry is configured to complete a signal path from a drive controller to the charger plug and back to the drive controller, that implements the mobility restriction and enables operation of at least one auxiliary function.

16. The method of claim 15, further comprising:
providing a message indicative of a state of charge to an operator.

17. The method of claim 16, wherein the providing the message comprises providing the message wirelessly.

18. The method of claim 15, further comprising:
providing a message indicating that the charger plug is connected to the charging receptacle.

19. The battery powered vehicle of claim 1, wherein the detection loop completion circuitry comprises an electrical short between at least two terminals of the charger plug.

20. The battery powered vehicle of claim 1, wherein the detection loop completion circuitry comprises a wire loop electrically connecting two terminals of the charger plug.

* * * * *